Jan. 8, 1935.   B. S. FLORADAY   1,987,331
SEAT CONSTRUCTION
Filed June 16, 1930   2 Sheets-Sheet 1
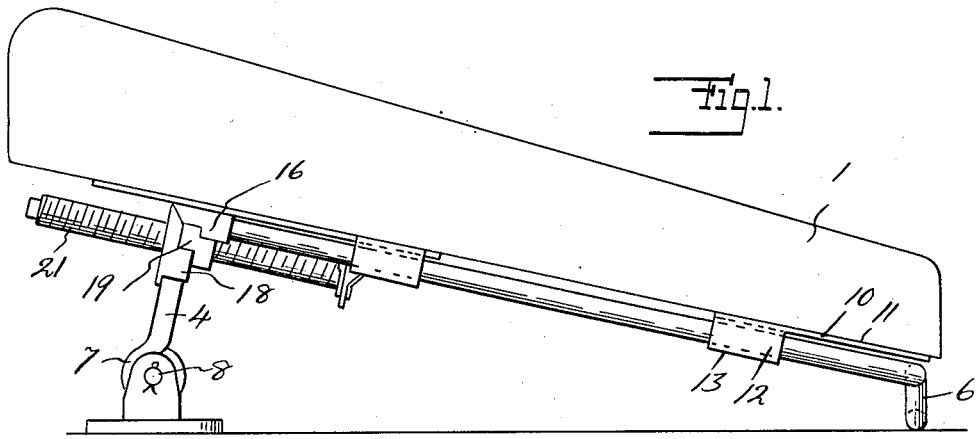
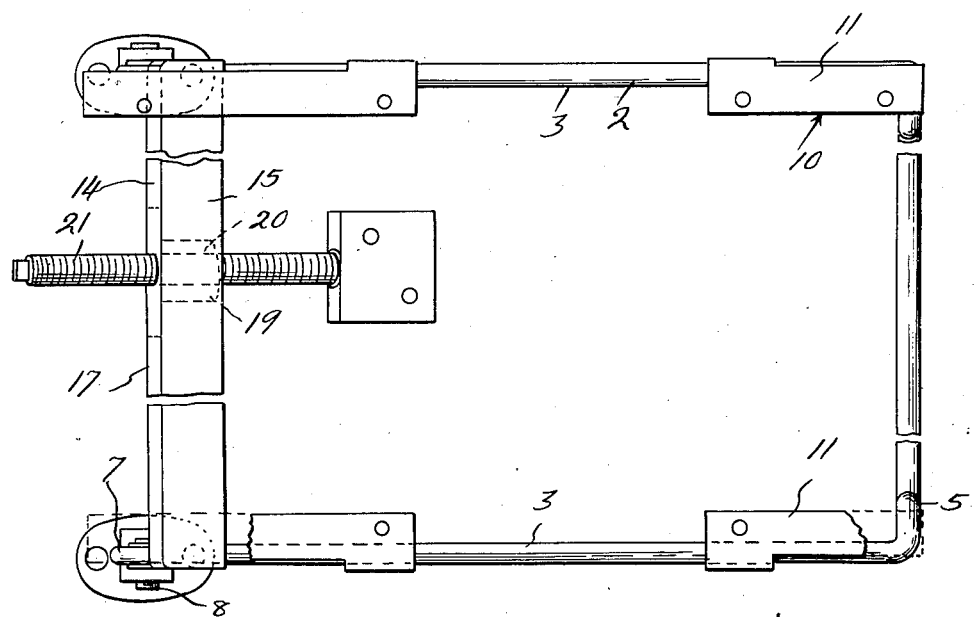
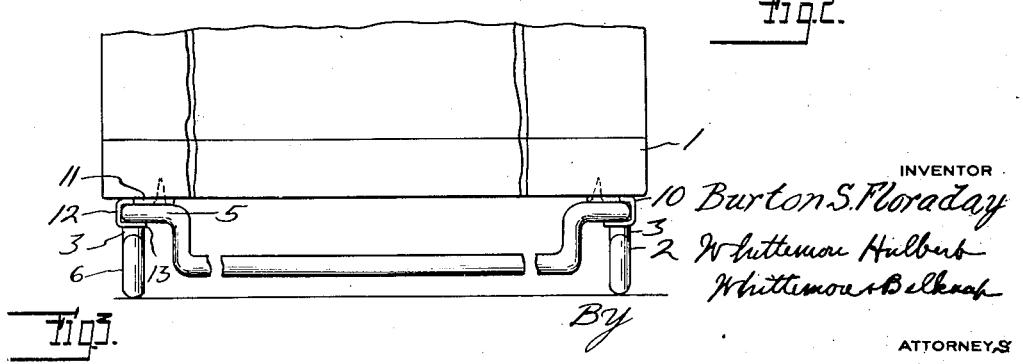
INVENTOR
Burton S. Floraday
Whittemore Hulbert
Whittemore & Belknap
BY
ATTORNEYS

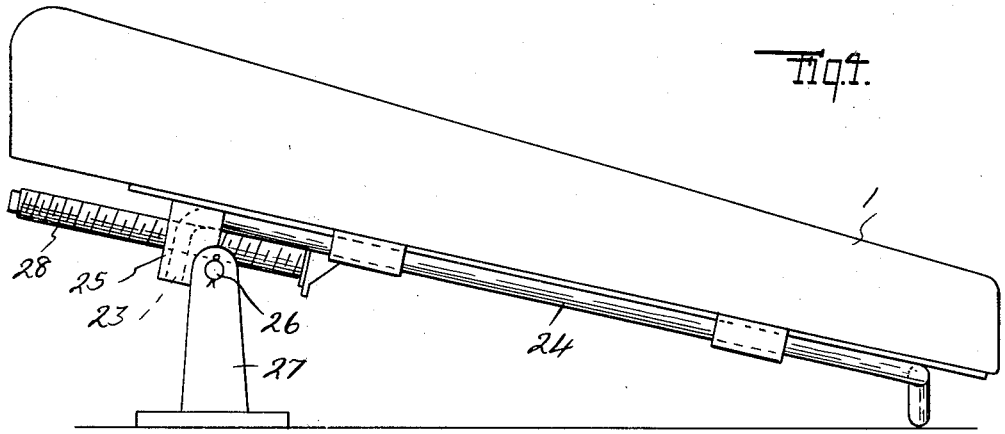
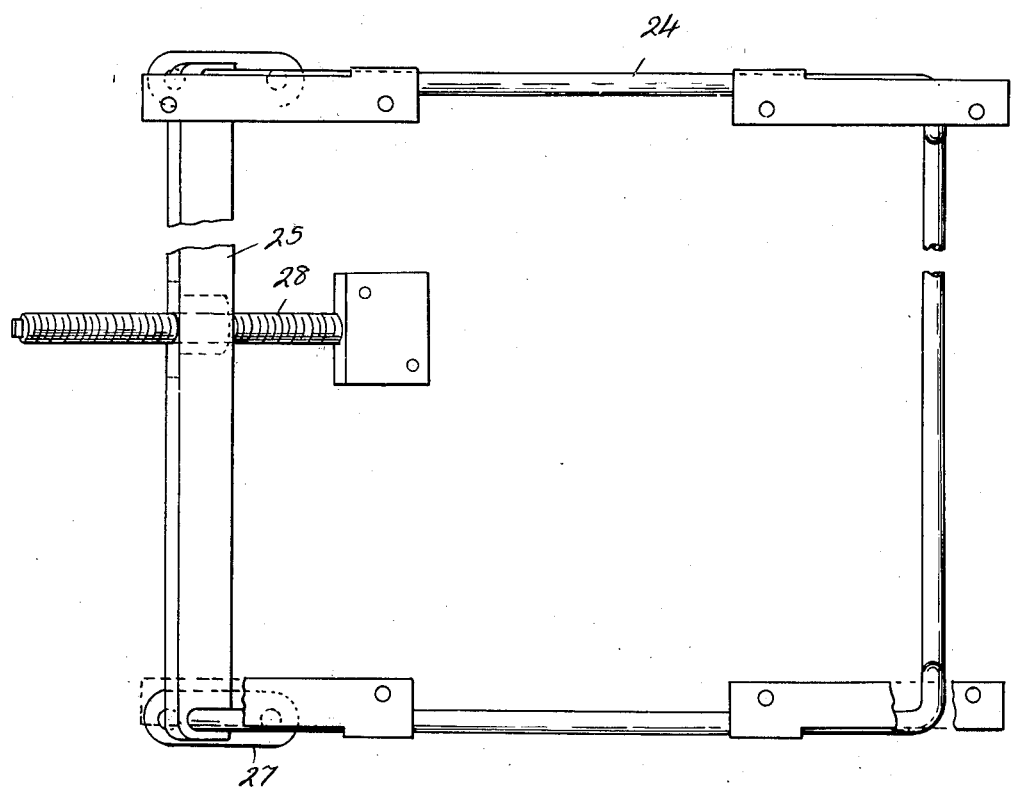

Patented Jan. 8, 1935

1,987,331

UNITED STATES PATENT OFFICE 1,987,331

SEAT CONSTRUCTION

Burton S. Floraday, Toledo, Ohio, assignor to The Dura Company, Toledo, Ohio, a corporation of Ohio Application June 16, 1930, Serial No. 461,532

4 Claims. (Cl. 155—14)

The invention relates to mountings for seats and refers more particularly to mountings for adjustable seats which are adapted for use in motor vehicles. One of the objects of the invention is to provide an improved seat mounting so constructed that it may be economically manufactured and the seat readily assembled therewith. Another object is to provide a one-piece mounting frame having guide portions for the seat and supporting portions for the frame. A further object is to provide a simple construction between the frame and the seat for adjusting the seat relative to the frame. Still other objects of the invention will become apparent from the following description, taken in connection with the drawings, in which Figure 1 is a side elevation of a seat mounting, showing an embodiment of my invention;

Figure 2 is a plan view thereof, with the seat removed;

Figure 3 is a rear end view thereof, partly broken away;

Figures 4 and 5 are views similar to Figures 1 and 2, respectively, showing a modified construction.

The seat mounting embodying my invention is adapted particularly for use in motor vehicles and especially with bucket seats. The mounting for the bucket seat 1 comprises the one-piece U-shaped frame 2 formed from a rod and having the spaced side portions 3, which guide and support the seat, the downwardly extending supporting portions or legs 4 at the front ends of these side portions, the inwardly extending lateral portions 5 at the rear ends of these side portions, and the downwardly extending U-shaped supporting portion or leg 6 connecting into the lateral portions. The supporting portions or legs 4 and 6 serve to support the side portions 3 above the floor of the motor vehicle and the front supporting portions or legs are formed with the eyes 7 at their lower ends for engagement with the pins 8, which are mounted in the bracket 9.

10 are shoes having the plate 11 which may be secured to the lower side of the seat 1 by suitable means, such as screws. These shoes also have the webs 12 which depend from the plates and the inwardly extending lateral flanges 13 at the lower edges of the webs. The plates are adapted to rest upon the side portions 3, while the lateral flanges are adapted to extend beneath these side portions and to prevent upward movement of the seat from its mounting. The webs of the shoes are located at the outer sides of the side portions and prevent lateral movement of the seat relative to the mounting. The lateral flanges 13 are adapted to clear the downwardly extending U-shaped supporting portion or leg 6 at the rear of the frame when assembling the seat upon the frame by a bodily movement of the seat longitudinally and forwardly of the frame.

As shown in Figures 1, 2 and 3, I have provided the cross bar 14, which is preferably formed of sheet metal and is channel-shaped. The ends of the upper flange 15 of this cross bar have the tongues 16 bent around the side portions 3 and engaging beneath their front ends. The ends of the web 17 of this cross bar have the tongues 18 bent around the front depending portions or legs 4 and engaging behind the same, the construction being such that the cross bar is fixedly secured to the frame and at the same time reinforces the frame at its junctures between its side portions and front depending portions. 19 is a suitable block, preferably in the nature of a casting riveted to the cross bar 14 within its channel and having the transverse threaded opening 20 for receiving the threads upon the screw 21, the front end of which is adapted for engagement with a suitable handle or crank and the rear end of which is secured to the bracket 22, which latter is fixedly secured to the lower side of the seat.

In the modification shown in Figures 4 and 5, the general arrangement of the mounting is the same as that shown in Figures 1, 2 and 3, with the exception that the front depending portions 23 of the frame 24 extend into the cross bar 25, which is preferably a die-casting, and the ends of this cross bar are pivotally connected by the pins 26 to the brackets 27. This cross bar is formed with the internally threaded bore for receiving the screw 28, which is formed and is operatively connected to the seat in the same manner as the screw 21.

What I claim as my invention is:

1. A mounting for an adjustable seat, comprising a U-shaped frame having spaced side portions and a downwardly extending U-shaped supporting portion laterally spaced from and connecting into corresponding ends of said side portions, a cross bar between the opposite ends of said side portions and embracing the same, and a screw operatively connected to said cross bar and to the seat for moving the seat longitudinally of said side portions.

2. A mounting for an adjustable seat, comprising a one-piece rod frame having spaced side portions and a downwardly extending supporting portion connecting into corresponding ends of said side portions, and shoe means secured to the seat and extending beneath said side portions, said frame having its side portions and supporting portion so arranged that said shoe means clear said supporting portion upon movement of the former past the latter.

3. A mounting for an adjustable seat, comprising a U-shaped frame having spaced side guiding portions, a cross bar between said guiding portions, shoe means secured to the seat and having laterally spaced surfaces slidably engaging opposite sides of the guiding portions, said frame including a U-shaped supporting portion extending downwardly from the frame and spaced laterally from the guiding portions a distance sufficient to permit engagement of the shoes with the guiding portions upon movement of the seat relative to the latter portions in the direction of the same, and means operatively connected to said cross bar and the seat for adjusting the latter upon the frame and for maintaining the shoes in assembled relation with the guiding portions.

4. A mounting for an adjustable seat, comprising a one-piece rod frame having spaced guiding portions, shoe means secured to the seat and having laterally spaced surfaces engaging the upper and lower sides of the guiding portions, said frame including a downwardly extending supporting portion connecting into the corresponding ends of the side portions and spaced laterally from the latter a distance sufficient to permit engagement of the shoes with the guiding portions upon movement of the seat relative to the latter.

BURTON S. FLORADAY.